United States Patent [19]

Jovic

[11] 3,843,849

[45] Oct. 22, 1974

[54] MULTIPLE STAGE TELECOMMUNICATIONS SWITCHING NETWORK

[75] Inventor: Nikola Ljotic Jovic, Chicago, Ill.

[73] Assignee: International Telephone and Telegraph Corporation, New York, N.Y.

[22] Filed: June 20, 1972

[21] Appl. No.: 264,568

[52] U.S. Cl. .......................... 179/18 FG, 179/18 GF

[51] Int. Cl. ............................................ H04q 3/50

[58] Field of Search ....... 179/18 GF, 18 GE, 18 FF, 179/18 FG, 18 EA, 18 E; 340/166 R

[56] References Cited

UNITED STATES PATENTS

| | | | |
|---|---|---|---|
| 3,177,291 | 4/1965 | Porter | 179/18 GF |
| 3,452,157 | 6/1969 | Yuan et al. | 179/18 GF |
| 3,531,773 | 9/1970 | Beebe | 179/18 GF |
| 3,542,960 | 11/1970 | Schneider | 179/18 E |
| 3,593,296 | 7/1971 | Girard et al. | 179/18 GF |
| 3,629,512 | 12/1971 | Yuan | 179/18 GE |
| 3,637,944 | 1/1972 | Gueldenpfennig | 179/186 GE |
| 3,660,600 | 5/1972 | Lee, Jr. | 179/18 EA |

*Primary Examiner*—Thomas W. Brown
*Attorney, Agent, or Firm*—James B. Raden; Marvin M. Chaban

[57] ABSTRACT

Disclosed is a switching network applicable for telecommunications use. The network includes four stages interconnected to complete a path therethrough automatically responsive to marking of the outer ends of the network. Each stage includes a plurality of crosspoint matrices, each matrix having intersecting multiples with electronic switching members at each crosspoint. Each such crosspoint has as its operative element a device such as a solid state thyristor. In certain of the stages, scanning networks respond to the end marking to sequentially enable crosspoints in those stages to find an end mark, while in at least one other stage, a number of crosspoints having access to an end marked point are enabled. Each stage responds to the end mark in a different way to complete a path therethrough with a minimum of blocking and fan out.

9 Claims, 11 Drawing Figures

PATENTED OCT 22 1974 3,843,849

PATENTED OCT 22 1974

3,843,849

SHEET 08 OF 11

MULTIPLE STAGE TELECOMMUNICATIONS SWITCHING NETWORK

RELATED APPLICATION

Reference may be had to my application filed of even date herewith entitled "Crosspoint Switching Matrix Incorporating Solid State Thyristor Crosspoints" for disclosure in greater detail of a matrix suitable for use herein.

BACKGROUND OF THE INVENTION

Multi-stage end-marked networks for telecommunications use are, of course, well known. For example, see my U.S. Pat. No. 3,576,950, issued 5/4/71, for a four-stage switching network which is generally similar in principle to the present network. In that patent, I used two-terminal PNPN diodes as the crosspoint elements. In the network shown by that patent, I applied a marking signal to each end of the network and allowed a path to be completed between the marked ends in what has been termed a "self-seeking" manner.

By the use of two-terminal devices, the need for auxiliary triggering or control networks was theoretically eliminated, however, in practice it was found that auxiliary networks for biasing and for controlling the ramp effect had to be implemented.

In still other known systems, the outer or end stages used one type of electronic element, while the intermediate stage or stages used another type of component, there being thyristors in the outer stages, and two element devices in the intermediate stage or stages in one known system.

SUMMARY OF THE INVENTION

The present invention provides a thyristor-matrix network capable of using identical crosspoint matrices for all stages. The network is designed to respond to marking of its ends and to automatically complete a path between the end marks without further external implementation or selection. Certain of the stages have control scanners responsive to the end marking of a conductor in a stage to generate firing signals to fire an idle path through the stage between the marked conductors. Other stage or stages act to complete a path by enabling all conductors capable of reaching a marked end of the network thus completing a path to one of these conductors. In the remaining stage, an enabling network responds to the end mark to enable all the thyristor gates and allow the crosspoints of that stage to respond solely to the marking of the matrix ends.

In this way, a network, including a plurality of stages, each activated somewhat differently, may be formed. The size of each stage may be varied as desired, yet all stages employ multiples of the same basic matrix unit. Thus, identical matrix units, preferably fabricated, using integrated circuit techniques can be used for all stages. By adapting and joining matrix units, stages of different configuration may be constructed. Further, by providing different peripheral or enabling circuits for each stage, a network may be assembled to complete a random path therethrough responsive only to the end marking, with each stage operating somewhat differently.

It is, therefore, an object of the invention to provide a new and improved multiple stage switching network using identical crosspoints for all stages.

It is a further object of the invention to provide a multiple-stage, end-marked switching network using like units comprised of a solid state thyristor as the crosspoint element in all stages.

It is a still further object of the invention to provide an end-marking, multiple-stage switching network for telecommunications usage, in which each stage has identical matrix structure but in which different peripheral switching arrangments are provided to implement the switch-through of a serial path randomly selected through the network between the marked ends.

DETAILED DESCRIPTION OF THE DRAWINGS

Network Organization

In FIGS. 1–6, I show the organization of a switching network for a 100 line telecommunications systems, such as a telephone PABX. For larger or smaller systems, the principles shown herein apply, the trunking or jumpering being adapted to meet the needs of the particular situation. The matrices themselves are preferably of the type shown in my co-pending application, as mentioned previously, using a solid state thyristor or controlled rectifier at each crosspoint with suitable gating at the crosspoints and at the multiples.

Figure 1:
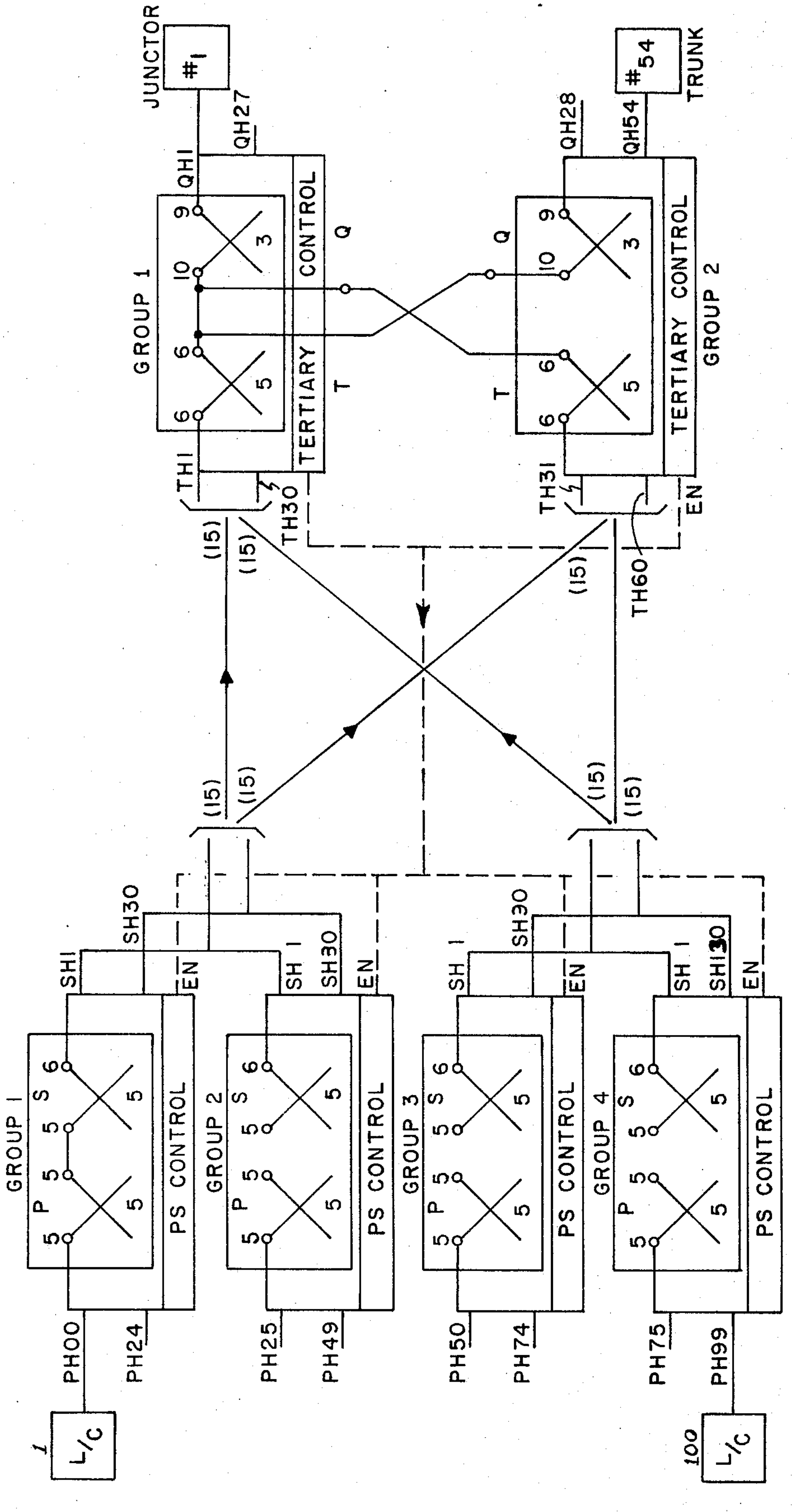
FIG. 1 is a schematic block diagram of a switching network for a 100 line telecommunications network using my invention.

In FIG. 1, I show a network employing my invention with four switching stages referred to as primary (P), secondary (S), tertiary (T) and quaternary (Q), respectively. The stages are shown as paired in that they may share an internal control network, as shown and described later herein. The primary-secondary pairings are grouped, there being four groups, each having connection to the line circuits for 25 of the hundred lines. The tertiary-quaternary stages are also grouped, there being two groups, as will be described, each having connection to 27 junctors or trunks.

Within Group No. 1 of the primary-secondary (PS) pairing, the primary matrix has its 25 PH multiple conductors individually connected to respective line circuits 00 to 24, the respective PH conductors being labeled as PH00 to PH24. Within each of the four primary groups are matrices of five by five configuration, there being five such matrices per group. Similarly, the remaining primary groups are connected to the remaining 75 line circuits in a like manner.

Within the secondary of each PS group, there are 30 SH conductors represented, these conductors providing the interconnection or jumpering to the tertiary state. In each secondary group are five matrices of 5×6 configuration. As can be seen in FIG. 1, the 30 outlet conductors from each group of the secondary stage are paired and are jumpered to the inputs of the tertiary-quaternary (TQ) stages. From a PS group, the jumpers are divided 15 to each TQ group. In addition, certain enabling leads from the PS controls are connected to the TQ controls, as will be explained.

The TQ stages have 60 inlets (TH conductors) and 54 outlets (TV conductors). The tertiary stage TH conductors have connected thereto the jumpers from the secondary SH conductors. Two PS groups form a 50 × 30 PS matrix by pairing identical SH conductors of each group such as SH1 – SH30 in the first PS matrix (PS groups 1, 2) and SH 31 - 60 in the second PS matrix (PS groups 3, 4). Each tertiary group matrix is of 6 × 6 configuration, there being five such matrices per group.

The QH conductors of the quaternary stage are connected to respective junctors, trunks and feature circuits. The junctors, however many are required, are allotted for calls either on demand or in advance, a system for the latter being shown in my U.S. Pat. No. 3,621,144, issued 11/16/71, with trunks and feature circuits being called in as necessary. In each of the two quaternary groups, there three 10 × 9 matrices.

Figure 2:
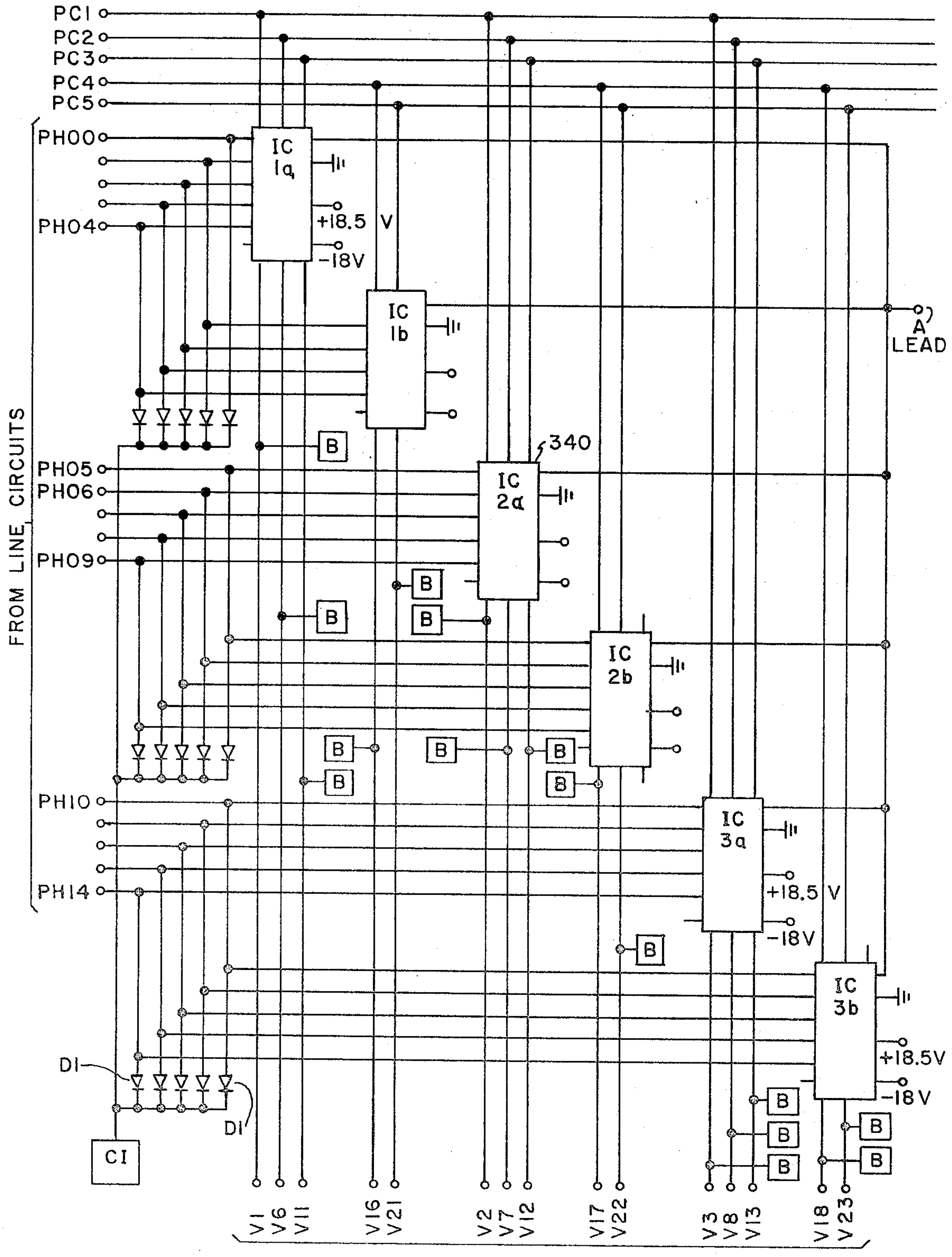
FIG. 2 is a schematic circuit diagram of a portion of a primary stage group of FIG. 1.

To more thoroughly understand the organization of a typical matrix of a stage, in FIG. 2, I show a portion of a primary group, the remainder of the group being essentially identical to that shown. In FIG. 2, I show six boxes labelled IC 1*a*, 1*b*, 2*a*, 2*b*, 3*a* and 3*b*, each box comprising one integrated circuit of the same type shown in my co-pending application previously referred to. Each unit such as IC 1*a* has six horizontal conductors and three vertical conductors intersecting to total 18 cosspoints. Since the basic integrated circuit unit employed is a 6×3 unit, a paired matrix has 6×6 capacity. However, in the primary stages, IC units are paired by interconnection to form matrices totalling 25 crosspoints. Thus, one horizontal conductor of each unit and one vertical of each unit pairing are unused for the 5×5 matrices of FIG. 2.

In the primary portion shown in FIG. 2, there are 15 horizontals and 15 verticals — the horizontals being designated PH00–PH14 and representing connection to line circuits 00–14, for example. To pair two IC units such as IC's 1*a* and 1*b*, each horizontal conductor of the two units is connected to a horizontal of the other unit of the pair for common connection to a particular line circuit. The horizontals of the group are also individually connected through diodes D1 and are commoned for connection to a control initiating circuit (CI) as will be described with reference to FIG. 3. Each unit is suitably biased to reference levels and each has connection to an A lead common to the unit as will be explained. Each vertical has connected thereto an individual bias control circuit indicated by the box referred to as box B, which will be described later.

Each 5×5 primary stage unit pairing has its verticals connected to respective five primary control enabling leads labelled PC1–5, Thus, in a group with 25 vertical conductors, each PC conductor will have control over a vertical in each of the five unit pairings. Further, each vertical conductor is interconnected to a conductor of the secondary stage, the conductors being staggered as indicated by the reference characters of FIG. 2. Thus, verticals 1–5 of the primary are connected to conductors V1, 6, 11, 16 and 21 of the secondary to spread the load more evenly.

Figure 3:
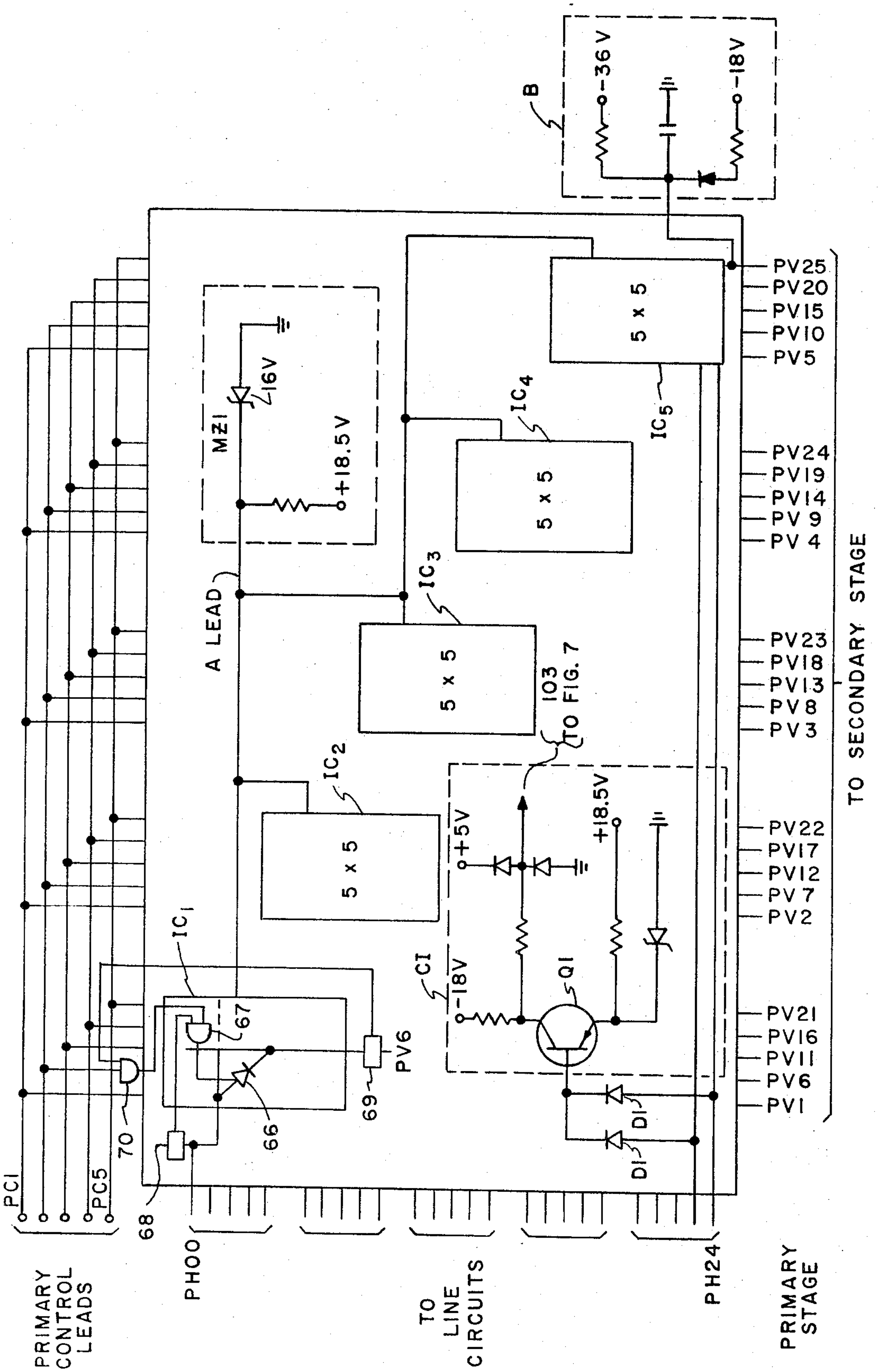
FIG. 3 is a block diagram in schematic form of a primary stage group of FIG. 1.

In FIG. 3, I show in block form, the organization of a 25 line primary group comprised of five 5×5 IC unit pairings to comprise five matrices. The conductors PH00–PH24 of the group, as shown, are connected to line circuits 00–24, respectively.

Also shown in FIG. 3 is one sample crosspoint 00–6 comprising a thyristor or SCR labelled 66, and having its anode terminal connected to a PH conductor 00, its cathode to conductor PV6, and its gate lead as the output of AND gate 67. Both multiple conductors have suitable threshold detectors 68 and 69 feeding the inputs to the gate, the PV connection being through a gate from the enabling gate 70. The operation of the crosspoint itself is explained in detail in my co-pending application as noted.

As mentioned with respect to FIG. 2, each matrix such as IC1 has an individual enabling lead connected to each respective PC leads 1–5 for control purposes. Each IC matrix has a connection to the common reference network over the A lead. For the primary stage, a zener diode MZ1 designed for voltage stabilization at +16 volts is connected between the A lead, a source of +18.5 volts dc and a ground source. The A lead thereby provides a positive reference or standard voltage (+VR) for the PH conductors.

Each group PV conductor has connected thereto a B biasing circuit connected to negative voltage sources for providing a voltage more negative than a negative reference (−VR) level, the B circuit being clamped to provide −18 volts dc bias for each PV conductor.

Connected to all PH conductors through respective diodes D1 is a control initiating circuit (CI). This circuit includes a transistor Q1 common to the PH conductors of the primary group 1. While only two PH conductors are shown commoned to the CI circuit, it may be understood that all such PH conductors are connected to this circuit in a like manner. Transistor Q1 responds to a marking voltage applied to a primary PH conductor to shut-off and transmit a signal on lead 103. This signal initiates the functioning of the network controls to complete a path through the network as will be described.

The PV conductors of the primary stage group shown are connected to the SV conductors of the secondary group with which the primary group is paired. With 25 PV conductors on the primary, there are 25 SV conductors on the secondary and these are interconnected directly, as shown.

In the primary stage, the B bias circuit provides a more negative voltage than the −VR reference for all idle crosspoints. This bias enabled one terminal of each crosspoint so that only two other signals, the VA>VR and the gate enabling signal are required to fire a crosspoint.

Figure 4:
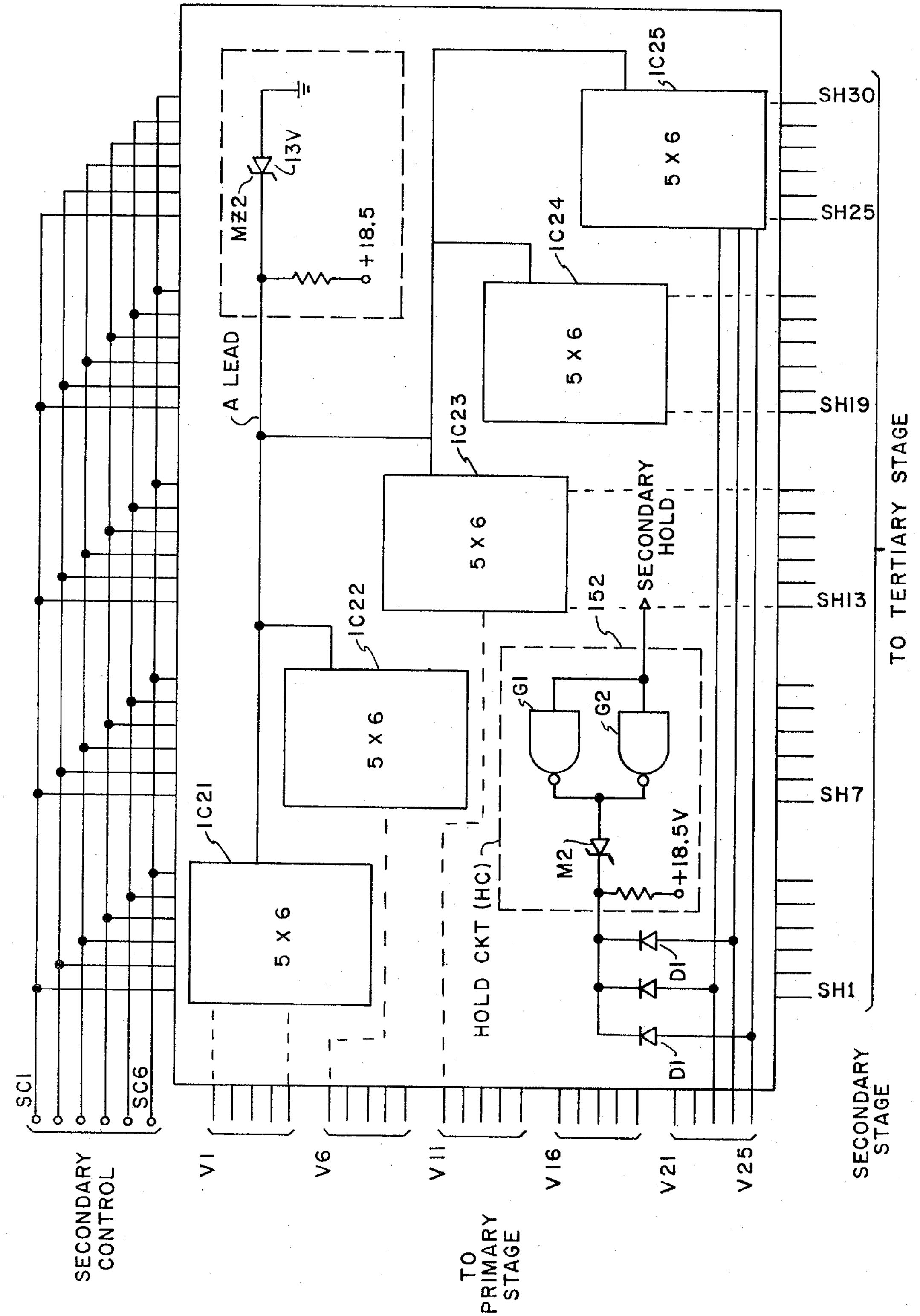
FIG. 4 is a block diagram in schematic form of a secondary stage group of FIG. 1.

In FIG. 4, I show in block form the organization of a typical secondary group, Group 1. Within the group, the IC units are paired to form 5×6 matrices, there being five such matrices labelled IC21–25. The SH conductors of the secondary stage are controlled by the respective control leads SC1–6, serving as crosspoint gate enabling leads, there being six SH conductors and six control leads in this stage. Each SV conductor in this stage has individual thereto, a diode D1 leading to a common in the form of a secondary hold circuit (HC) whose function will be described later.

Each matrix IC21–25 has a connection to an A biasing circuit, the biasing circuit for this stage having a zener diode MZ2 with voltage level of +13 volts providing that voltage as the +VR voltage for the secondary stage. The "B" biasing networks for the secondary stage for electrical reasons are physically located on the TQ boards (TH leads).

Figure 5:
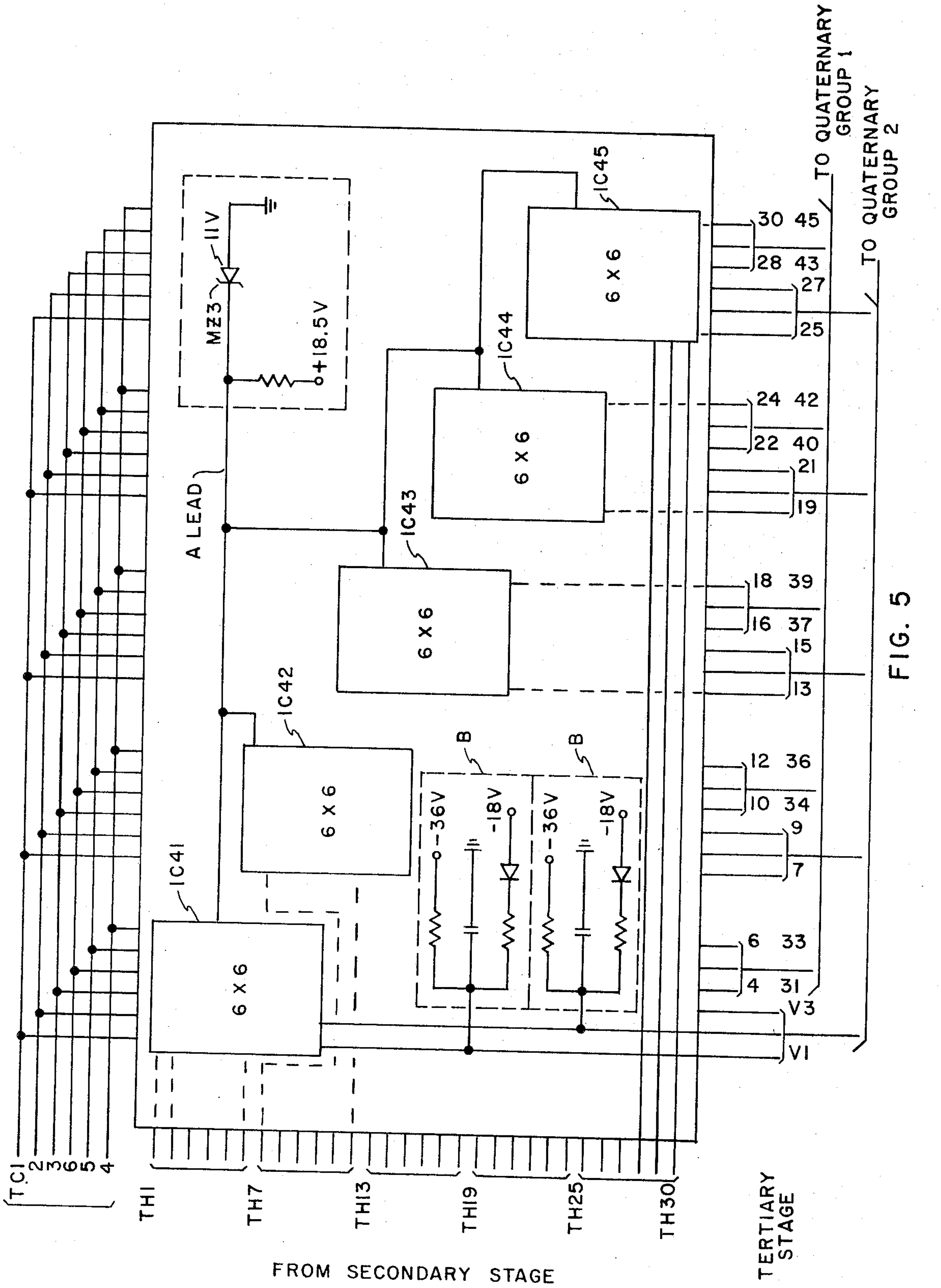
FIG. 5 is a block diagram in schematic form of a tertiary stage group of FIG. 1.

In FIG. 5, I show a typical tertiary stage utilizing IC pairings to constitute five 6×6 matrices IC41–45. The 6×6 matrices are formed by pairing two 6×3 units and having no spare or unused conductors. The TH conductors of this station are connected or jumpered to the SH conductors of the secondary stage with each TH conductor of the tertiary stage having connected to it one SH conductor from different groups of the secondary stage.

The TV conductors of this stage are connected to the QV conductors of the quaternary stage with half of the TV conductors in one group being connected to QV conductors of the same group; the remaining SV conductors being connected to QV conductors of the other group.

Within each tertiary matrix, such as IC41, an enabling conductor TC controls one or more TV conductors to comprise conductors TC1–TC6 in the jumbled order shown in FIG. 5. Each TV conductor has connected thereto a B biasing network as shown in FIG. 5 and similar to that in FIG. 3 for providing the enabling bias for the crosspoint cathode terminal. Each unit pairing is also biased with an A biasing network, the A network having a zener diode MZ3 whose voltage is set at +11 volts providing the positive reference level for that stage.

Figure 6:
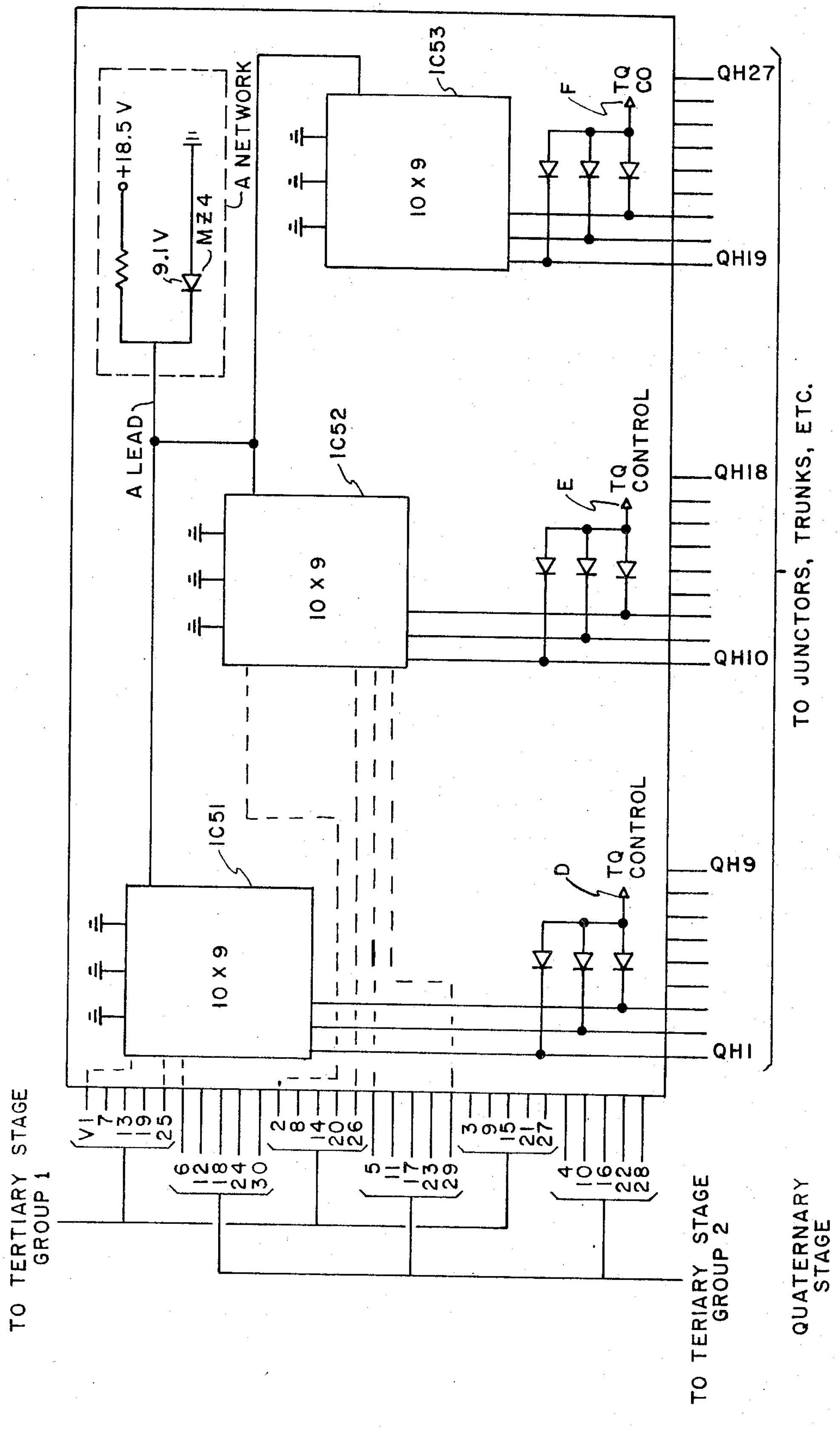
FIG. 6 is a block diagram in schematic form of a quaternary stage group of FIG. 1.

In FIG. 6, I show a typical quaternary group in which its IC units are joined to make 10×9 matrices, there being three such matrices per group; IC's 51–53 for Group 1 being shown. As mentioned with respect to the tertiary stage, the QV conductors of the quaternary stage are divided such that one half have connection to the respective TV conductors of the tertiary group, with which the particular quaternary group is paired. The remaining conductors have connections to TV conductors of the other tertiary group. For the quaternary station, no control leads are required. Each IC unit in the station has connection to an A biasing network including a zener diode MZ4, the zener diode MZ4 of the quaternary stage being one which is designed to pass 9.1 volts as the +VR for this network.

The QH conductors of this station are respectively connected as mentioned previously to junctors, trunks and feature circuits. Each QH conductor is connected through a diode to a bus common to the QH conductor from that IC matrix, the busses being designated D, E, and F for the respective 10×9 matrices, IC51, 52, and 53, and connected to the tertiary control as will be described. In the quaternary stage, the crosspoint gate terminals are permanently enabled by the ground shown on the QV conductors, the purpose of which will be described later.

However, it should be noted that three conditions must occur to fire a crosspoint — +V bias above reference, –V bias below the reference and the enabling signal to the gate terminals. In the primary, secondary and tertiary stages, the B bias networks permanently provide –V bias below the threshold for conductors of all idle crosspoints. In the quaternary stage, the gate terminals of idle crosspoints are permanently enabled. All stages have one firing condition enabled, hence only two are required to fire an idle crosspoint, the particular conditions differing between the quaternary and the other stages.

Brief Description of Completion of a Path through the Network

Briefly stated, the primary control responds to end marks on a PH conductor and a QH conductor to sequentially enable and fire an idle crosspoint in the primary stage having access to the marked conductor during one successive interval of the scan operation of the primary control PC. During each interval, successive enabling scans of idle secondary crosspoints having connection to the particular primary crosspoint fired during that interval are attempted. Under the secondary control, these sub-intervals provide periods during which the firing of an idle secondary crosspoint may occur each sub-interval.

At the same time, the mark in the quaternary QH conductor is transmitted from the specific marked quaternary conductor to enable all tertiary crosspoints having access to the marked quaternary, this transmission being affected through the tertiary control. When an enabled tertiary finds the secondary conductor connected to it in a fired condition, the tertiary and quaternary crosspoints fire completing a path through the four stages of the network. The completed path is held by the current conditions of the matrices continuing to be met.

Figure 7:
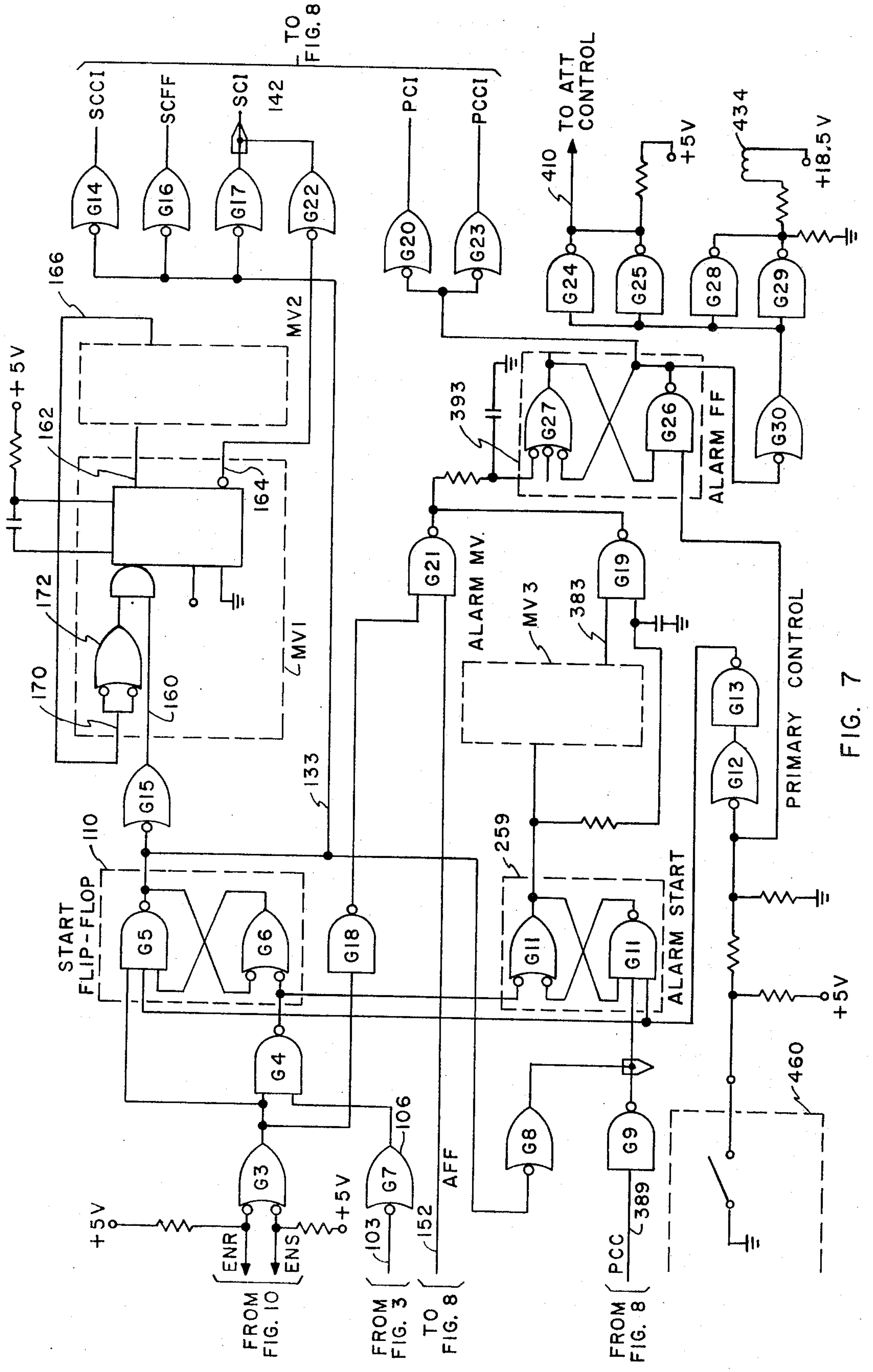
FIGS. 7 an 8 combine to form a schematic circuit diagram of the primary and secondary control for a group of pairing of FIG. 1, with FIG. 8 adapted to be placed at the right of FIG. 7 with a shorter side of the drawings in common.
Figure 8:
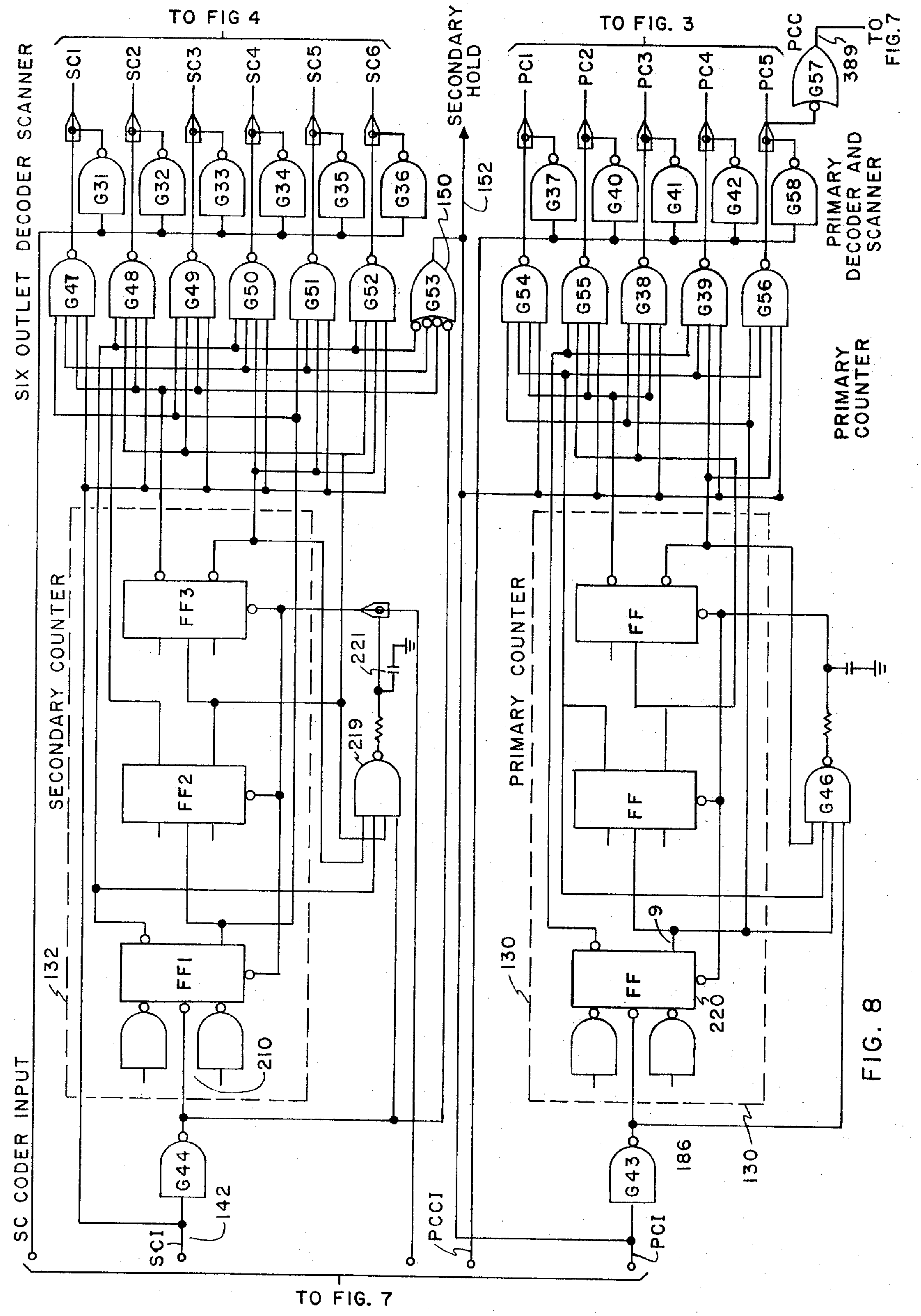

To implement these controls, the PS controls of FIGS. 7 and 8 include an oscillator comprised of MV1 and MV2, both being identical except for the duration of their cycle. The timers MV1 and MV2 are serially connected so that their additive time periods constitute one sub-interval. These counters trigger a three flip-flop secondary stage counter 132 at the end of each sub-interval to add one to a count, the count being manifested by a signal on one of the six SC crosspoint-enabling leads. When the counter is reset to zero, the counter triggers a primary stage counter 130 to initiate a primary timing interval.

During the primary timing interval, one PC lead is enabled to fire an idle primary crosspoint at the intersection of the enabled PC lead and the marked PH conductor. During six successive sub-intervals of the secondary control, an enabling signal is emitted to fire the idle secondary crosspoint at the intersection of an SH lead and the fired primary stage conductor controlled by HC enabled SC lead, during each sub-interval seeking to find a complete path to the tertiary stages.

Figure 11:
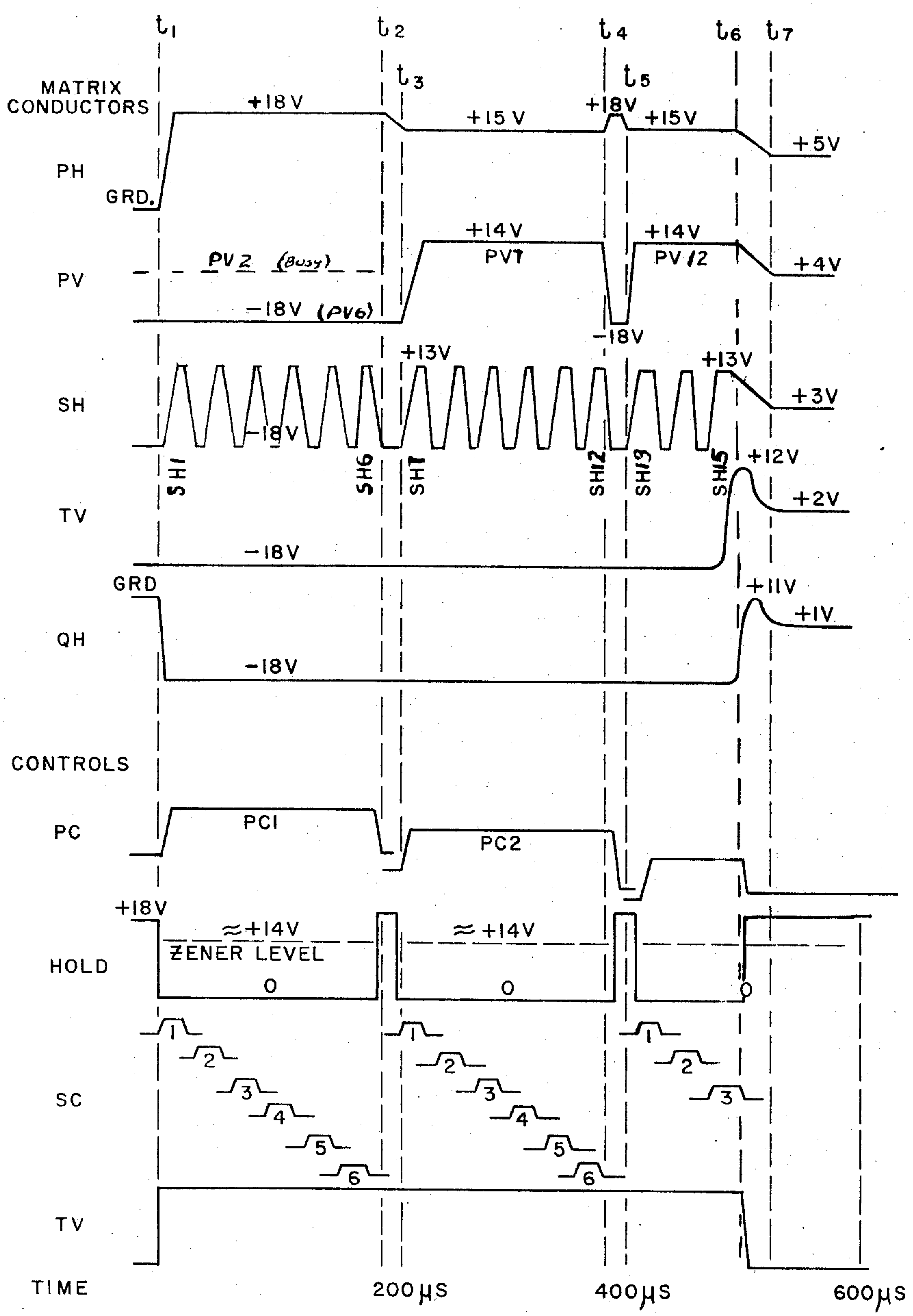
FIG. 11 is a simplified timing diagram illustrating the operation of the network and its controls.

Turning now to FIG. 11, there I show a timing diagram which should aid in illustrating the operation of the network. In that drawing at time $t1$, I show the mark voltage signal on the PH conductor resulting in a sharp voltage rise, which occurs when a station goes off hook seeking to initiate a call, the voltage once it reaches the peak value of +18.5 volts levels off. For purposes of explanation, we will assume that the PV1 conductor is busy and has the PV1 lead at the holding voltage which is more positive than −12 volts, the PV level necessary for firing of a crosspoint.

At the same time, t1, the QH conductor of the junctor allotted for the call, is marked with a negative signal, preparatory to firing one or more crosspoints in the quaternary matrix.

At time t1, the primary control enables the gate conductor of the primary conductors connected to conductor PC1. The auxiliary or temporary hold circuit HC is also energized but its effort is wasted since no primary crosspoint can fire without all three conditions being present, ie, PH mark of + voltage above the + threshold, PV signal in the form of an idle voltage more negative than −12 volts and the presence of an enabling signal.

During this PC1 interval, the SC counter enables successive SC conductors during successive sub-intervals to no avail since no bias (more positive than the +VR reference voltage of the secondary stage) is received on the conductors from the prior stage.

At time *t*2, which constitutes the end of the PC1 interval, the primary counter passes to PC2. The hold circuit HC fires a pulse to release any held crosspoints in an uncompleted path. For purposes of explanation, it is assumed that PV6 is not busy, thus at a time t3, the primary crosspoint at the intersection of the marked PH conductor, whose PV conductor is idle and which is connected to control lead PC2, fires. The voltage applied to the crosspoint drops to the hold level under the control of hold circuit HC. The voltage across the PV conductor rises to the hold potential.

The secondary counter begins its counting cycle to enable respective SH conductors to find the positive potential of a fired primary crosspoint and the negative potential of a fired tertiary crosspoint. If it is assumed that the tertiary outlets or TV conductors enabled are busy due to a previous operation, the SC cycle fires respective secondary crosspoints which are (1) connected to the fired primary crosspoint and (2) enabled by an SC signal.

At the end of the SC cycle (time *t*4), the hold network release pulse occurs to release the held primary crosspoint and cause the primary counter to step to its PC3 position. A crosspoint in the primary stage corresponding to the marked PH, and enabled PC3 lead fires and is held at the held potential. An SC cycle is then started at time *t*5. It is assumed that an available secondary horizontal is connected to an idle tertiary conductor which is, in turn, connected to the marked QH conductor. Thus, during the SC scan (assume SC3) the fired primary crosspoint controlled by PC3 and the fired secondary crosspoint controlled by SC3 find an available path to the fired QH conductor to complete a path through the network at time *t*6.

At that time, the PH voltage drops to the busy level, as do the remaining points in the completed path, the only potential differences being the small voltage drops across the respective fired crosspoints at time *t*7.

Returning now to the tertiary and quaternary stages as viewed from the timing chart of FIG. 11 — at time *t*1, the QH mark places one operating signal on crosspoints of the quaternary matrix. The gate leads of the crosspoints in this stage are permanently enabled. Thus, the firing condition sought is the positive potential from the tertiary stage.

In the tertiary stage, the tertiary control divides the TV conductors into six sections, three per board. Each such section has connection to one-third of the QH conductors on that board. When a QH conductor is marked, the TC control places an enable signal on the gate terminals of crosspoints having access to the marked QH conductor (half of the tertiary crosspoints being located in the first TQ group and the other half in the second TQ group).

When a tertiary TH conductor is connected to a fired secondary crosspoint, its voltage increases above the threshold. When this condition co-exists with an enabled gate terminal (indicating access to the marked QH conductor) a tertiary crosspoint will fire raising the potential of a quaternary crosspoint to the firing level and completing a path through the network. Now the external (to the matrix) networks (ie, line circuit and junctor) control and maintain the matrix signalling level as necessary, such as the voltage level indicated as beyond the time *t*7 in FIG. 11. Both PS and T control networks stop functioning responsive to a positive change due to either seizure or the end of the QH mark signal at time *t*6.

Primary - Secondary Control

The operation of the PS control circuits may best be described relative to the operation of a call through the network, stage by stage. First, assume that the line associated with a line circuit connected with a primary conductor goes off hook. During the allot period, as described in my previously cited U.S. Pat. No. 3,621,144, the line voltage rises toward +18.5V. When the voltage exceeds 16V, the transistor Q1 in the primary start circuit Cl of FIG. 3 switches off. The simultaneous presence of the signal on lead 103 resulting from transistor Q1 switching off, and the resulting QH mark transmitted over EN leads (as will be described later) starts the PS control of FIGS. 7 and 8.

Referring now to FIGS. 7 and 8, the control operation is started on a logic "0" at either ENR or ENS lead being received in conjunction with a mark signal from the line circuit. This mark signal on the PH conductor turns off transistor Q1 (FIG. 3) and places a signal on lead 103, which is detected by gate G7 (FIG. 7). This gated signal along with a signal on the ENR lead is forwarded to gate G4, causing the start flip-flop 110 to set such that gate G6 is at "1" state and gate G5 at "0" state.

The start flip-flop 110 being set, causes a start signal over a path through gate G15 to start multivibrators MV1 and MV2 operating and initiate a PC interval. The flip-flop set signal removes an inhibit condition from the primary and secondary counting circuits 130 and 132 (FIG. 8) over a path from the gates of flip-flop 110 over lead 133. This flip-flop signal also removes the inhibit condition of secondary decoder via gate G17 and lead 142. This change also removes the inhibit condition of the primary decoder and primary auxiliary holding network via OR gate G53 (FIG. 8) and lead 152.

Multivibrator MV1 is part of a basic oscillator circuit which includes multivibrators MV1 and MV2. In one exemplary form, MV1 may have a cycle duration of 15 microseconds and MV2 a cycle duration of 18 microseconds, the total being the duration of a sub-interval of the secondary control. Gate G15 at the input to MV1 responds to the start signal from flip-flop 110 to place a logic 1 at the input of AND gate 160 of MV1. A logic condition "1" is placed on lead 162 shortly thereafter, while lead 164 exhibits a logic "0" condition. When MV1 times out, leads 162 and 164 reverse their condition. A logic "0" on lead 162 of MV1 causes output lead 166 of MV2 to feed back a logic "1" to the input lead 170 of OR gate 172 of MV1 causing MV1 to recycle. When MV2 has timed out, a logic "0" is placed on the input gate 172 of MV1 and the cycle repeats as long as input lead 160 of MV1 remains at logic "1" level.

Every time a logic "0" appears at output 164 of MV1, the secondary counter 130 (comprising a three stage flip-flop) is caused to increase its count by one, via gate G22, lead 142 and gate G44. An exception occurs initially and subsequently every time the secondary counter is reset. Under this exception condition, the primary counter is also caused to increase its count by one, via gates G53 and G43. Also every time the primary counter is pulsed, through gates G53 and G43, the auxiliary primary holding network HC of FIG. 4 is returned to +18.5 via holding gates G1 and G2 of FIG. 4 by way of lead 152, thus permitting the release of any crosspoint in the secondary and primary stages held at the end of an unsuccessful primary control pulsing interval.

As explained previously, a logic "0" condition at leat 164 of MV1 causes the secondary counter to change its count. This adding is effected via gate G22, lead 142 and gate G44 (FIG. 8) which places a logic "0" at input lead 210 of FF1 of the secondary counter 132. Assuming that the secondary counter was reset, this change would cause counter to decode a "1" via gate G47 of the secondary decoder. The signal from the secondary counter (defining the start of a scanning sub-interval) is transmitted to lead SC1 which, in turn, enables all secondary crosspoints associated with secondary horizontals $SH_1$, $SH_{13}$, $SH_{19}$, $SH_{25}$, as seen in FIG. 5. When lead 164 of $MV_1$ has switched to logic "1," the signal at SC1 is removed to define the end of the first sub-interval. In the meantime, FF1 of the secondary counter is "primed." The next time, lead 164 of $MV_1$ emits a logic "0," the secondary counter is forced to decode a "2" via gate G48 which extends a ground signal to SC2 and thus enables all secondary crosspoints associated with $SH_2$, $SH_8$, $SH_{14}$, $SH_{20}$, $SH_{26}$.

The operation just described repeats and the secondary counter decodes consecutive digits 3, 4, 5, 6 each time lead 164 of $MV_1$ is again set to its "0" level. The decoded signals are sent to $SC_3$, $SC_4$, $SC_5$ and $SC_6$ via gates G49, G50, G51 and G52, respectively. These signals, in turn, enable all crosspoints associated with secondary horizontals:

$SC_3$ - $SH_3$, $SH_9$, $SH_{15}$, $SH_{21}$, $SH_{27}$ $SC_4$ - $SH_4$, $SH_{10}$, $SH_{16}$, $SH_{22}$, $SH_{28}$ $SC_5$ - $SH_5$, $SH_{11}$, $SH_{17}$, $SH_{23}$, $SH_{29}$ $SC_6$ - $SH_6$, $SH_{12}$, $SH_{18}$, $SH_{26}$, $SH_{30}$

Each of these control signals enables the gate terminals of crosspoints to fire a crosspoint in the secondary stage when proper bias conditions have been met by the particular crosspoint.

At the count of 6 after lead 164 of $MV_1$ has put out a logic "1," the secondary counter is reset via gate 219 of the secondary counter. The "0" is momentarily stored at capacitor 221 to permit the proper reset of the secondary counter.

Since the secondary counter 130 is reset, a count of zero is decoded via AND gate G53 (FIG. 8). This zero count results in two conditions: (1) The primary auxiliary holding network HC of FIG. 4 is returned to +18.5 via lead 152 and gates G1 and G2, thus permitting release of a primary crosspoint that has been switched on during the existing count; the flip-flop 220 of the primary counter is "primed." The subsequent zero condition at lead 164 of $MV_1$ causes the primary counter to increase its count by one via gate G53, lead 152 and gate G44. At the same time the voltage of the auxiliary holding network (HC of FIG. 4) changes to about +15V over the path through gates G1 and G2.

Assuming that the primary counter is reset, the first time gate G43 (FIG. 8) places a logic "0" at input 222 of flip-flop 220, the primary counter decodes a "1" via gate G54 (FIG. 8) which, in turn, extends a ground signal to $PC_1$ lead. This signal enables all crosspoints associated with the following primary conductors: $V_1$, $V_2$, $V_3$, $V_4$, and $V_5$.

The operation previously described repeats and causes the primary counter to decode in turn numbers 2, 3, 4, and 5. The decoded signals are extended to $PC_2$, $PC_3$, $PC_4$ and $PC_5$, via gates G55, G38, G39 and G56, respectively.

The primary crosspoints associated with the following verticals are sequentially enabled in this manner, one primary interval occurring after the secondary has scanned through its SC sub-intervals:

$PC_2$ - $V_6$, $V_7$, $V_8$, $V_9$, $V_{10}$ $PC_3$ - $V_{11}$, $V_{12}$, $V_{13}$, $V_{14}$, $V_{15}$ $PC_4$ - $V_{16}$, $V_{17}$, $V_{18}$, $V_{19}$, $V_{20}$ $PC_5$ - $V_{21}$, $V_{22}$, $V_{23}$, $V_{24}$, $V_{25}$

Note that the total time to scan the entire matrix is given by the equation below $T=P \times S \times t$, where P and S are the maximum counting periods of the primary and secondary scanners and $t$ is the period of basic oscillation frequency in micro-seconds. For the particular case disclosed herein, $T=5 \times 6 \times t = 30t = 30 \times 38.3\ \mu s = 1{,}149\ \mu s$ for a complete scan.

Figure 9:
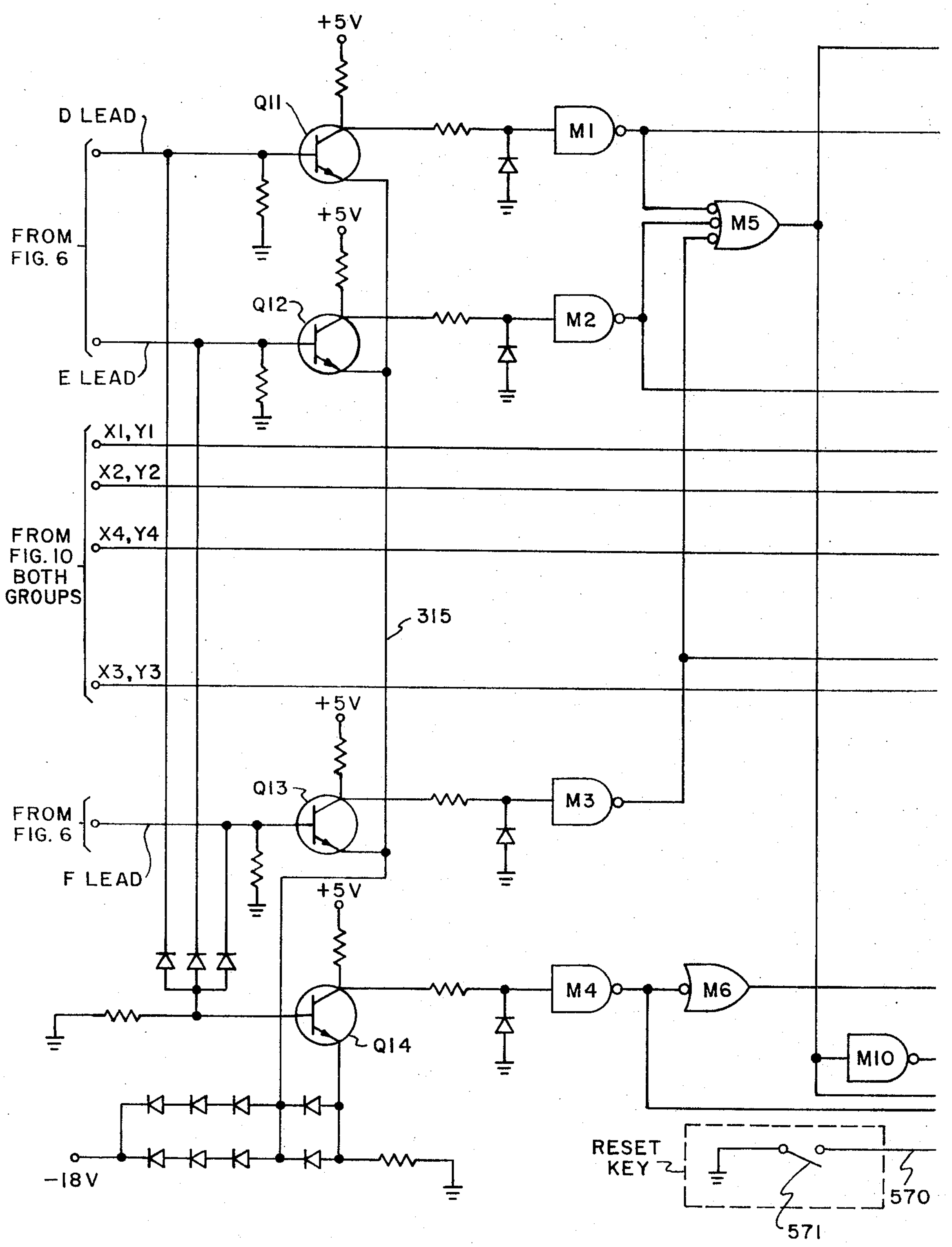
FIGS. 9 and 10 combine to form a schematic circuit diagram of the tertiary control of FIG. 1, with FIG. 10 adapted to be placed at the right of FIG. 9 with a longer side of the drawings in common.
Figure 10:
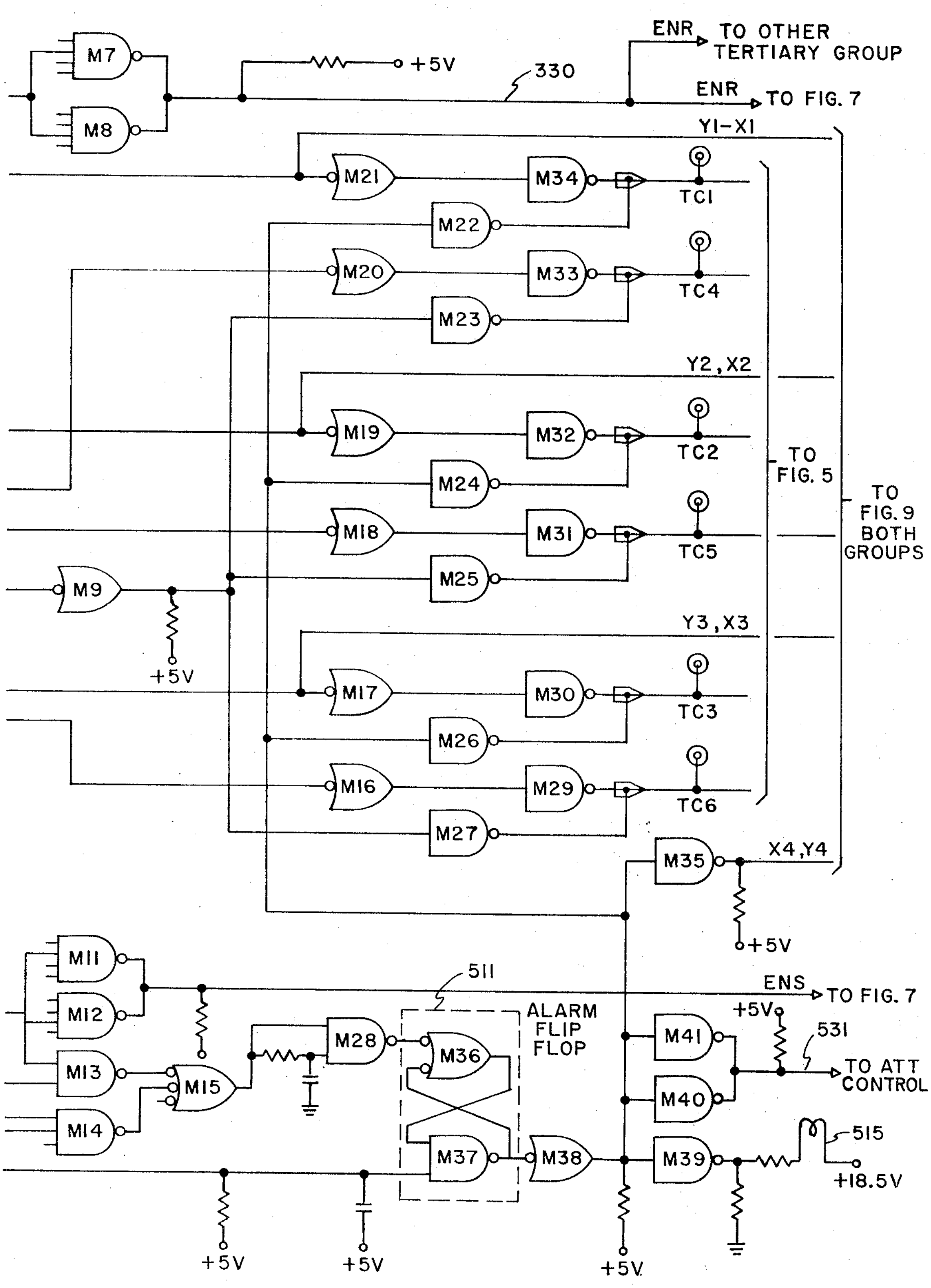

The control stops counting whenever both ENS and ENR signals received from the circuit of FIGS. 9 and 10 are removed from the input to gate G3 of FIG. 7. This latter condition happens either when a path is established or at the end of QH mark pulse, the latter indicating that no junctor is available for completion of a path. The removal of these signals causes the start flip-flop 110 to reset via gate G3 such that gates G6 and G5 of flip-flop 110 emit logic conditions "1" and "0," respectively. The following action takes place:

The oscillator comprising multivibrators $MV_1$ and $MV_2$ is stopped via gate 120. The primary and secondary counters are reset via gates G46 and G219. The auxiliary holding network of gates G1 and G2 is returned to +18.5 over a path through gates G17, G44, G53 to gates G1 and G2. The alarm state FF comprising gates 260 and 261 is reset via gate G8.

Tertiary Controls

Now turning to the operation of the tertiary control for both that stage and for quaternary stage, when a QH mark is extended by the system to the TQ matrix in the manner set forth in my cited U.S. Pat., the signal is emitted from the matrix unit of the marked horizontal on either the D, E or F lead of FIG. 6. The resulting signal is detected by a particular marked matrix in the quaternary stage. The transistor detecting the signal is switched off, and over lead 35 causes transistor Q14 to turn off also.

Since the operation is identical for all transistors in the transistor group Q11–Q13, only operation of the control associated with transistors Q11 and TQ Group or Board No. 1 will be described in detail.

As explained before, the particular QH mark switches both transistor Q11 and Q14 off. In response to this shutoff, gate M1 places a logic "0" to OR gate M5 and also to gate M21 of the TQ decoder. In addition, a signal is sent via the $Y_1$ lead of board $TQ_1$ to the $X_1$ lead of the board $TQ_2$ (FIG. 1).

These gate signals cause the following: A logic "0" is extended to the PS boards over a path from gates M5, M7 and M8 over the ENR lead. All tertiary crosspoints located in the board TQ Group No. 1 and associated with the TC1 connected outlets $V_1$, $V_7$, $V_{13}$, $V_{19}$ and $V_{25}$ are enabled via gates M21 and M34 and lead TC1.

All tertiary crosspoints located on TQ Board No. 2 associated with outlets $V_{33}$, $V_{36}$, $V_{39}$, $V_{42}$, $V_{45}$ are enabled via gates M20 and M33 and lead TC4 by way of a crossover connection between TC1 of TQ1 and TC4 of TQ2.

The crossover connection between appearance of the QH signal and the crosspoints affected may be summarized by the following table:

| | | | TQ No. 1 Board | | TQ No. 2 Board | |
|---|---|---|---|---|---|---|
| | QH MARK | TRANSISTOR Q | VIA TC | TERTIARY LEADS ASSOCIATED WITH OUTLETS | VIA TC | TERTIARY LEADS ASSOCIATED WITH OUTLETS |
| TQ No. 1 | 1–9 | Q11 | 1 | $V_1,V_7,V_{13},V_{19},V_{25}$ | 4 | $V_{33},V_{36},V_{39},V_{42},V_{45}$ |
| | 10–18 | Q12 | 2 | $V_2,V_8,V_{14},V_{20},V_{26}$ | 5 | $V_{32},V_{35},V_{38},V_{41},V_{44}$ |
| | 19–27 | Q13 | 3 | $V_3,V_9,V_{15},V_{21},V_{27}$ | 6 | $V_{31},V_{34},V_{37},V_{40},V_{42}$ |
| TQ No. 2 | 1–9 | Q11 | 4 | $V_{33},V_{36},V_{39},V_{42},V_{45}$ | 1 | $V_1,V_7,V_{13},V_{19},V_{25}$ |
| | 10–18 | Q12 | 5 | $V_{32},V_{35},V_{38},V_{11},V_{44}$ | 2 | $V_2,V_8,V_{14},V_{20},V_{26}$ |
| | 19–27 | Q13 | 6 | $V_{31},V_{34},V_{37},V_{40},V_{43}$ | 3 | $V_3,V_9,V_{15},V_{21},V_{27}$ |

In addition, when the transistor Q14 switches off responsive to a QH mark, a signal is extended from this transistor to the PS boards over a path through gates M4, M6 and the combination of gates M11 and M12 and ENS lead.

Completion of Path through the Network

A more detailed description of the completion of a path through the network may best be described as follows: If a station seeking service goes off hook, this condition is detected by the line circuit serving that station assumed to be LC06. During one scan time period responsive to the mark on a line circuit and circuit 06 indicating a request for service from that line, the PS control enables all crosspoints associated with the control leads PC1 and SC1. In the primary stage, verticals PV2,7,12,17 and 22 are enabled, there being one vertical in each of the five matrices of the group serving line 06 enabled (as can be seen best in FIG. 3), while the secondary group, a plurality of horizontals are enabled as follows: PV2 has access to SH1–6, PV7 access to SH7–12, PV12 access to SH13–18, PV17 access to SH19–2 and PV22 has access to SH25–30. Since the switching conditions of the primary stage are satisfied (as set forth in my co-pending application), the conditions being (1) Line voltage on the marked horizontal being more positive than the primary detection level of 16 volts due to bias network A; (2) The voltage at the enabled verticals is approximately −18V (well below negative detection level) due to bias network B; and (3) The control signal at PC1 is present, the crosspoint located in IC2*a* (FIG. 2) and connecting PH06 and $V_2$ switches on and is locked to ground provided by the hold network HC of FIG. 4, including zener diode 353 and gates G1 and G2. The voltage level on the V conductors settles between 13.5 and 14.3 volts which is above detection level of 13V as established by the A network of the secondary matrix. Therefore, since the switching conditions of the secondary stage crosspoint are satisfied, ie, voltage at the secondary detection level, the voltage at $SH_1$ is more negative than −12V (negative detection level) and the control signal at $SC_1$ is present, the crosspoint located in $IC_{21}$ connecting $V_2$ to $SH_1$ is switched on.

It has been assumed that system is idle. Therefore, the TQ matrix causes the path to be extended and would be established from PH06 via $IC_1$ - $V_2$ - $IC_6$ - $SH_1$ and the TQ stages to the junctor or supervisory circuit. Once the path is established, the matrix voltages in the meantime will have fallen within busy voltage range requirements.

In order to illustrate completion of the through path, it is assumed that the junctor or an exemplary QH conductor such as QH3 is marked. It is further assumed that only $V_{30}$ is idle (all other V conductors of this stage are busy). In response the TQ stages to this condition, ie., QH3 of TQ1 being marked; signals appear on TH conductors sequentially in the order marked by (X) in table following by means of the control and coding gates of FIG. 8.

| | TQ No. 1 | TQ No. 2 |
|---|---|---|
| TH1 | X | |
| TH1 | | x |
| TH7 | X | |
| TH7 | | x |
| TH13 | X | |
| TH13 | | x |
| TH19 | X | |
| TH19 | | x |
| TH25 | X | |
| TH25 | | x |
| TH2 | X | |
| TH2 | | x |
| TH8 | X | |
| TH8 | | x |
| TH14 | X | |
| TH14 | | x |
| TH20 | X | |
| TH20 | | x |
| TH26 | X | |
| TH26 | | x |

-Continued

| | TQ No. 1 | TQ No. 2 |
|---|---|---|
| TH3 | X | |
| TH3 | | x |
| TH9 | X | |
| TH9 | | x |
| TH16 | X | |
| TH16 | | x |
| TH21 | X | |
| TH21 | | x |
| TH27 | X | |
| TH27 | | x |

As previously explained, a mark on a quaternary H conductor such as QH3 will turn off both transistors Q11 and Q14 on the TQ No. 1 board. Consequently, lead TC1 on TQ No. 1 and lead TC4 on TQ No. 2 will be marked with an enabling signal.

If, for explanatory purposes, it is assumed that all quaternary verticals except V30 are busy, as the signals at TH leads appear in the order indicated by the foregoing chart, none of the scanned crosspoints can be switched on because the biasing conditions for crosspoints are not met due to the presence of the busy condition bias.

Assuming the presence of signal at TH1 on TQ No. 1: At the instant of firing of a crosspoint in the secondary stage that has access to TH1, the voltage there starts to rise. Eventually it will exceed the tertiary positive detection level (nominally set at 11 volts). Therefore, only one of the bias conditions necessary for switching is met. No crosspoint switching occurs. The reasons are as follows:

The crosspoint associated with $V_2$ has not fired because of a busy condition at $V_2$ and resulting lack of necessary bias. The crosspoints associated with $V_3$, $V_{31}$, way of 32 and $V_{33}$ have not fired because of absence of the control signal at TC2–TC6.

For exactly the same reason, no crosspoint fires in the presence of the TH1 signal that is extended to TQ2 a short time later. In addition, for exactly the same reason the other TH signals will be ignored by the TQ matrix. Finally, when the last signal appears at TH27 of TQ2 (approximately 1 ms since the QH mark has been applied), the switching of the tertiary diode associated with TH27 occurs.

Viewing this condition in greater detail, the voltage at TH27 (TQ2) rises and eventually exceeds the positive tertiary reference level to provide one necessary bias condition. The inlet $V_{30}$ (located at TQ1) and connected to tertiary outlet $V_{45}$ (located at TQ2) is not busy. Therefore, the voltage at this point is approximately −18V providing the second necessary bias condition. Finally, the control signal is present at TC4. As a result, the crosspoint is switched on, causing the voltage of $V_{30}$ to rise. Eventually the quaternary reference level normally set at 9.1V is exceeded. This satisfies the necessary switching conditions. Since the other two conditions are satisfied, the quaternary crosspoint connecting $V_{30}$ and $QH_3$ will switch on. Once the quaternary crosspoint has switched on, the voltage level throughout the matrix settles to a busy (signalling) level.

When an established matrix path is to be released, the release is effected by starving fired crosspoints of current, following a hang-up condition. Both ends of the matrix cause line circuits to change their respective voltage levels to ground.

Busy Status

If the system is busy, with no paths through the tertiary stage available, a call is started in the same manner, causing enabling of $PC_1$ and $SC_1$. A scanned crosspoint in the primary stage will fire. With the system busy, the voltage levels across the secondary crosspoint multiples will be insufficient to trigger crosspoints. Therefore, after a proper time has elapsed, a control signal is extended to $SC_2$ lead. In a similar manner, as described earlier, the crosspoint associated with $V_2$ and $SH_2$ will switch on (because all switch-on conditions are satisfied). Again, on account of the TQ groups having no available paths, no connection can be made. Therefore, after a delay, $SC_3$, $SC_4$, $SC_5$ and $SC_6$ are sequentially marked and the crosspoints associated with $V_2$, on the one hand, and $SH_3$, $SH_4$, $SH_5$ and $SH_6$ on the other hand, are switched on. After the last attempt has been made, the secondary control switches off the auxiliary holding network. Since the voltage level at this point rises toward +18.5, the primary crosspoint that had fired is forced to release, and the signal at $PC_1$ is removed.

The second cycle starts after a short delay by marking $PC_2$ and $SC_1$. The primary crosspoint located in $IC_3$ associated with marked horizontal PH06 and $V_7$ is switched on and locked up into the auxiliary holding network of FIG. 4. In a similar manner, as described earlier, $SH_7$, $SH_8$, $SH_9$, $SH_{10}$, $SH_{11}$, $SH_{12}$ are sequentially attempted in compliance with the sequence of control signals that appear at $SC_1$, $SC_2$, $SC_3$, $SC_4$, $SC_5$, $SC_6$ to complete a second scanning cycle.

The third, fourth and fifth cycle are repeated in the same manner and are executed in compliance with the sequence of primary control signals that appear at $PC_3$, $PC_4$ and $PC_5$.

Since connection is not made on a busy condition throughout, the PS control continues to scan by starting again the first cycle. Eventually a QH mark is removed. When this happens, the PS control resets itself, causing all scanning activities to stop.

An established path is released by application of the release conditions on a crosspoint, ie, the externally applied current is reduced below the holding current level of a crosspoint. This condition is achieved by either causing both ends of the network, ie, PH and QH switch to ground or to +18.5V by releasing the held junctor.

Alarm Conditions (PS Control)

Within the system as disclosed herein, there are two valid alarm conditions: (1) Failure of counters 130 and 132 of FIG. 8 to operate when the start flip-flop 110 is set; and (2) failure of holding circuit of FIG. 4 to return to +18.5 when the start flip-flop 110 is reset.

If either counter stops counting when either ENR or ENS signal is present for a sufficiently long time (which implies that path has not been established during this time) the PS control alarm is activated.

This activation is achieved as follows:

At the initiation of the operation, gate 4 places a logic "0" which sets the alarm start flip-flop 259 with its gates G10 and G11. Gate G11 places a logic "1" at lead 381 of $MV_3$ which causes $MV_3$ to extend a logic "0" from terminal 383 to gate G19. If within 1.2 ms the alarm start flip-flop 359 is not reset by the decoded "5" gate G56 over a path through OR gate G57 and lead 389 to gate G9 of FIG. 7; $MV_3$ will time out and cause gate G19 (FIG. 8) to place a logic "0" to alarm flip-flop 393 (FIG. 7) comprised of gates G27 and G26.

If during the idle state of the PS control, gate G22 is at the logic "1" level as a result of failure of the holding network of FIG. 4, gate G21 would place a logic "0" to alarm flip-flop 393 via gate G18. This results in an alarm condition as subsequently described.

When the alarm flip-flop 393 is set by either action condition, the following reactions occur: A minor alarm signal is extended to the attendent control over lead 410 over a path through gates G20, G21 and G30. The board alarm lamp 434 is lit via gates G30, G28 and G29. Also, all crosspoints on the board are enabled in the following manner: Primary crosspoints are enabled by way of leads $PC_1 - PC_5$ over paths through the corresponding gates G37, G40, G41, G42 and G43 in the primary decoded of FIG. 8 and gate G23 (FIG. 7). Secondary crosspoints are enabled via leads $SC_1$–$SC_6$, corresponding gates G31–G36 of FIG. 8 and gate G20 of FIG. 7.

The alarm condition may be cleared by depressing reset key 460 (FIG. 7) which may be located in any convenient location. A logic "0" is extended from the reset key 460 via lead 470 to the alarm flip-flop 343 which is caused to reset. By the same action of the reset key other flip-flops in the circuit are reset via gates G12 and G13.

In the TQ stage of the network, a valid alarm condition exists when there is a discrepancy between ENR and ENS signals. This condition may occur in either or both signal states on these leads.

Either of the possible "out of phase" condition is detected by the exclusive "or" circuit comprised of gates M13 and M14 of FIG. 10. As long as the two signals (ENR and ENS) are "in phase" with both transistors Q11 and Q14 in the same condition, ie, on or off. In the off state gates M5 and M4 violate the "and" requirement, and gate M14 stays at "1" logic level. So does gate M13, since gate is at logic "0" and gate M10 is at logic "1" level.

The opposite is also true, ie, when both transistors Q11 and Q14 are on. The "and" switching requirements of gates M13 and M14 is violated because both gates M5 and M6 are at logic "0" level.

Therefore, an alarm condition will exist only when the signals appearing at collectors of transistors Q11 and Q14 are "out of phase." Under this condition either gate M13 or M14 will place a logic "0" to the alarm FF511 via the "delayed zero" (to cover for the possible delays due to propagation of signals) by way of gate M15.

The alarm FF511 being in the set state causes the following results: Alarm lamp 515 is lighted via gates M39, M38 and M37; alarm signal is extended to the attendant control over lead 531 by way of gates M41 and M40. As a result all tertiary crosspoints appearing on this board and used to access Q matrix on the same board are enabled as follows:

TC1 lead by gate M22
TC2 lead by gate M24
TC3 lead by gate M26.

All tertiary crosspoints appearing on the other board and used to access the Q matrix on this board are enabled via gate M35 (lead Y4) and gate M9.

Lead TC4 is enabled through gate M23
Lead TC5 is enabled through gate M25, and
Lead TC6 is enabled through gate M27.

(Note that gates M9, M35 and M23, 25 and 27 are located on the other board, ie, group 2.) To reset the alarm flip-flops 511, an external signal is needed via the reset key lead 570 and reset key 571.

It should be noted that during an alarm condition, one of the switching requirements, ie, presence of a control signalcondition (3) — is met beforehand, thus enabling the matrix operation.

Conclusions

It should be noted that when a crosspoint is held, the crosspoint is immune to outside effects. By the use of the enabling signals applied, I disable an entire horizontal or vertical as the case may be, when a crosspoint on that conductor has fired. Thus, there can be no interference between adjacent crosspoints to cause misfiring.

Some advantages over prior systems are that voltage levels are not changed within the matrix so that they appear as noise transmitted on the PH conductor and heard the calling party as noise during the path completion process. Only the voltage levels in the control circuits and the control signals change during the scanning and call completion process and these are masked against reaching the calling party.

I claim:

1. A switching network including a plurality of cascaded stages, means for automatically completing a path through said stages from an input circuit requesting service to a network output circuit, each of said stages comprising at least one matrix, each of said matrices comprising a plurality of intersecting input and output multiples, means for coupling output multiples of preceding stages to the input multiples of succeeding stages to cascade said network, crosspoint elements positioned at the intersections of each input and output multiples to comprise said matrices, said crosspoint elements capable of being switched from a non-conducting state to a conducting state to interconnect said intersecting multiples in the conducting state, the invention comprising a control circuit connected to the output multiple conductors of said plurality of stages, said control circuit comprising means normally inhibiting the crosspoint elements of a plurality of said stages to prevent said inhibited crosspoint elements from switching to the conducting state, said control circuit further comprising enabling means for successively enabling crosspoint elements of the output multiple conductors in the stage to which said control circuit is connected to enable successive crosspoint elements coupled between said input circuit requesting service and said enabled output multiple, and means for applying second signals to the output multiples of switched crosspoint elements for holding an operated crosspoint element in the conducting condition wherein said enabling means are operative during successive time intervals to switch a different crosspoint element during each of said intervals and wherein there are second enabling means operative during each interval to successively enable output multiple conductors of said second stage to switch crosspoint elements in a second stage of said network which are connected to the output conductor of a switched crosspoint element of said one stage and the enabled output multiple conductor of said second stage.

2. A network as claimed in claim 1 wherein there is further control circuit means for enabling crosspoint elements in other stages, and for switching a crosspoint element in said other stages to complete a path from the output multiple conductor of a switched crosspoint element of said second stage to said network output circuit.

3. A telephone system comprising a plurality of cascaded matrices, each of said matrices including first and second multiples arranged to provide intersecting crosspoints, means for identifying one multiple in a first matrix of said cascaded matrices by an individually associated time frame, means responsive to simultaneous marking of multiples in first and last of said cascaded matrices for initiating a time frame scan during the time frame which identifies said marked multiple in said first matrix for operating an idle crosspoint in said first stage for the purpose of establishing a connection between said marked multiples, and means responsive to the initiation of said time frame scan for initiating a succession of time sub-frame scans in another matrix to find an idle crosspoint in said other matrix for connecting the marked multiple of the first matrix to the output multiple of said second stage.

4. A system as claimed in claim 3, wherein there is a control circuit, and means for initiating the operation of said control circuit responsive to said simultaneous marking, said initiating means being redundant to provide a trouble signal in the absence of marking signals from one of said redundant initiating means.

5. A multiple stage switching network, in which each stage is comprised of identical matrix units, and in which each of said matrix units has input conductors and output conductors intersecting at crosspoints with outputs of one stage coupled to respective inputs of an adjacent stage, the invention comprising switching means at each crosspoint including at least three terminals, said switching means each having an enabling input terminal and first and second bias terminals responsive to signals applied to said terminals, each said crosspoint requiring two bias conditions and an enabling condition for operating the switching means at a crosspoint, said network operative in response to a signal at each end of said network in the form of a signal mark on one input conductor of a first stage and a signal mark on one output conductor of a final stage for initiating a path search through said network, between the marked input conductor of the first stage and the marked output conductor of said final stage, means in one stage for normally providing a first bias condition to one input of all idle crosspoints of said one stage, means for providing a second bias condition to one input conductor in said one stage responsive to a signal mark on said input conductor, and means for sequentially enabling one output conductor of said one stage during each of a plurality of scan intervals to operate a switching means at the crosspoint between the one input conductor and the one output conductor of said one stage on the concurrence of first and second bias conditions and the enabling of the output conductor of said one stage.

6. A network as claimed in claim 5, wherein there is means for providing a first bias to crosspoints of a second stage, means for transmitting a signal from the conductor of an operated switching means of the one stage to an input conductor of said second stage, and means for successively enabling output conductors of said second stage during each scan interval to complete a serial path through said one and said second stages.

7. A network as claimed in claim 5, wherein the crosspoints of another stage are permanently enabled during a path search through the network and means for operating one switching means in said other stage on a marked output conductor are responsive to an indication on the input conductor of said one crosspoint switching means that said input conductor is connected to an operated switching means of said second stage.

8. A multiple stage switching network comprising a plurality of cascaded stages, each stage being comprised of a plurality of matrices wherein each matrix comprises a plurality of input and output conductors intersecting at respective crosspoint elements of a single type, with each crosspoint element of each stage including a bistable switching device, said network having input devices individually coupled to respective input conductors of a first stage and output devices individually coupled to output conductors of a final stage, means in said network responsive to a first marking signal from an input device to an input conductor of said first stage and a second marking signal from an output device for initiating a search for an available path through the stages of said network, each such crosspoint switching device including a gate terminal and bias terminals, said search initiating means including allotting means for enabling successive gate terminals of crosspoints of the first stage coupled to the marked input conductor of said first stage to render one of said crosspoints in said first stage conductive on concurrence of the enabling of a crosspoint gate terminal and the presence of a first marking signal from the input device, means for enabling the gate terminals of crosspoints of said final stage and maintaining said crosspoints enabled during the entire path search to render crosspoints of said final stage conductive responsive to the second marking signal from said output device, and means for successively allotting gate terminals of an intermediate stage of the network to complete a path between conductive crosspoints of said first and final stages.

9. A network as claimed in claim 8, wherein said network includes a further intermediate stage, wherein the crosspoint switching devices of the network comprise thyristors and wherein a predetermined proportion of the thyristors of said further stage are enabled responsive to the conduction of a thyristor of said final stage to await path completion from said intermediate stage.

* * * * *